US010494179B1

(12) United States Patent
Alspaugh et al.

(10) Patent No.: US 10,494,179 B1
(45) Date of Patent: Dec. 3, 2019

(54) SYSTEMS HAVING V-SHAPED CONVEYORS AND METHODS OF USING THE SAME

(71) Applicant: Amazon Technologies, Inc., Seattle, WA (US)

(72) Inventors: David Alspaugh, Seattle, WA (US); Paul Raines, Seattle, WA (US); Timothy Talda, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/156,552

(22) Filed: Oct. 10, 2018

(51) Int. Cl.
*B65G 1/10* (2006.01)
*B65G 15/10* (2006.01)
*B65G 15/12* (2006.01)
*B65B 63/02* (2006.01)
*B65G 1/06* (2006.01)

(52) U.S. Cl.
CPC ..................... *B65G 1/06* (2013.01)

(58) Field of Classification Search
CPC .......... B65G 1/10; B65G 15/10; B65G 15/12; B65B 63/02
USPC ............ 198/604, 608, 626.1, 626.2, 370.01, 198/370.03, 370.04, 370.06, 370.1; 53/439, 529
See application file for complete search history.

(56) References Cited

U.S. PATENT DOCUMENTS

| | | | | |
|---|---|---|---|---|
| 4,711,338 A | * | 12/1987 | Carson | B65G 15/14 198/396 |
| 4,991,709 A | * | 2/1991 | Steeghs | A21C 9/08 198/460.1 |
| 5,273,392 A | * | 12/1993 | Bernard, II | B65G 1/0485 198/341.04 |
| 5,434,428 A | * | 7/1995 | Paladini | G01B 11/043 250/223 R |
| 5,810,061 A | * | 9/1998 | Yuyama | B65B 43/58 141/129 |
| 5,868,240 A | * | 2/1999 | Knoepfel | B21F 33/04 198/405 |
| 5,890,581 A | * | 4/1999 | Oppliger | B07C 1/04 198/604 |
| 6,508,153 B1 | * | 1/2003 | Lumberg | B65G 47/52 83/318 |

(Continued)

FOREIGN PATENT DOCUMENTS

WO  WO 2017/123678 A1  7/2017

*Primary Examiner* — Douglas A Hess
(74) *Attorney, Agent, or Firm* — BakerHostetler

(57) ABSTRACT

In one embodiment, a transfer system has a conveyor system with first and second conveyors. The first conveyor has inner and outer sides and a first conveyor surface between the inner and outer sides that is configured to carry payloads along a first direction. The second conveyor has inner and outer sides and a second conveyor surface between the inner and outer sides of the second conveyor that is configured to carry payloads along the first direction. The first and second conveyors are coupled to one another such that the inner sides are spaced closer to one another than the outer sides and the first and second conveyors are angularly offset from one another. The transfer system also has a movement system that moves the conveyor system along at least one of a vertical direction, and a second direction so as to align the conveyor system with another conveyor system.

19 Claims, 11 Drawing Sheets

(56) References Cited

U.S. PATENT DOCUMENTS

| | | | | |
|---|---|---|---|---|
| 6,540,062 B2* | 4/2003 | Wunscher | B65G 1/1373 | 198/395 |
| 7,032,737 B2* | 4/2006 | Egger | B65G 15/14 | 134/127 |
| 7,306,090 B2* | 12/2007 | Kim | B65B 61/28 | 198/459.1 |
| 7,337,892 B2* | 3/2008 | Groot | B65G 17/066 | 198/369.3 |
| 7,398,630 B2* | 7/2008 | Kovacs | B65B 9/067 | 198/461.1 |
| 7,407,056 B2* | 8/2008 | Lutz | B65G 37/005 | 198/626.1 |
| 7,810,635 B2* | 10/2010 | Kim | H01L 21/67748 | 198/465.1 |
| 7,861,844 B2* | 1/2011 | Hayduchok | B07C 3/087 | 198/370.1 |
| 8,061,503 B2* | 11/2011 | Ancarani | B65G 47/2445 | 198/398 |
| 8,776,986 B2* | 7/2014 | Morley | B65G 15/44 | 198/382 |
| 8,868,232 B2* | 10/2014 | Freudelsperger | B65G 1/1378 | 141/82 |
| 8,881,888 B2* | 11/2014 | Overley | B65B 59/04 | 198/345.3 |
| 9,309,055 B2* | 4/2016 | Pedretti | B65B 43/52 | |
| 9,399,555 B2* | 7/2016 | Fonnelop | B65G 21/06 | |
| 9,409,728 B2* | 8/2016 | Bastian, II | B65G 37/00 | |
| 9,415,938 B2* | 8/2016 | Oropeza | B07B 13/04 | |
| 9,598,239 B2* | 3/2017 | Lert, Jr. | B65G 1/0492 | |

* cited by examiner

SYSTEMS HAVING V-SHAPED CONVEYORS AND METHODS OF USING THE SAME

BACKGROUND

In material handling facilities, such as inventory processing facilities, sortation systems are commonly employed to sort intermingled payloads into a plurality of separate lots of the payloads. For example, the payloads can be inventory items or packages, and the lots can be separate customer orders of one or more of the inventory items. As another example, the payloads can be envelopes or mailers, and the lots can be postal addresses. In some sortation systems, delivery vehicles are employed to sort the payloads amongst a plurality of sort destinations, where each sort destination corresponds to one or more lots. For example, in the Sure Sort system manufactured by OPEX Corporation, payloads are sorted to sort destinations such as shelves by delivery vehicles referred to as iBOTs. The delivery vehicles move vertically and/or horizontally along a track system that is disposed at an inner side of the shelves. Once a delivery vehicle is vertically and horizontally aligned with a desired sort destination defined by one of the shelves, the delivery vehicle moves the payload to the desired sort destination to fulfill a lot. In some instances, where a lot includes a plurality of payloads, the delivery vehicles can deliver multiple payloads to a sort destination so as to fulfill a lot. Once a lot is fulfilled, the lot can be moved from its shelf for further processing downstream, and the shelf can be used to fulfill a subsequent lot. The Sure Sort system is described in U.S. Pat. No. 7,861,844 and PCT patent publication no. WO 2017/123678, the teachings of both of which are hereby incorporated by reference as if set forth in their entirety herein.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

Figure 1:
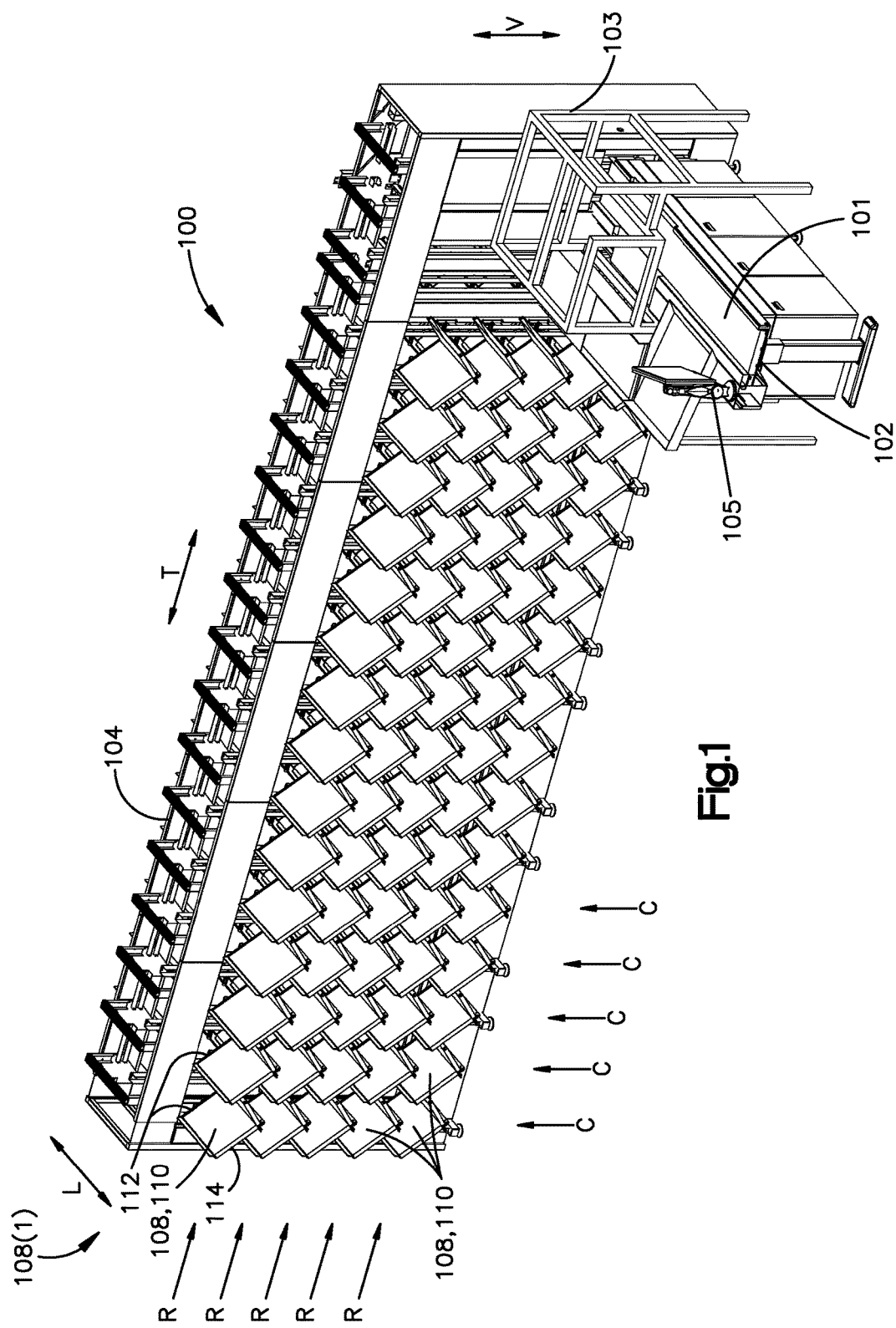
FIG. 1 shows a front perspective view of a sorting system according to one embodiment.

In some material handling facilities, the objects that are handled can vary significantly in both size and shape. Such variation can present challenges to automating processes that handle the objects. For example, some objects can have a flat surfaces that limit rolling of the objects, while other objects can have curved surfaces that make such objects susceptible to rolling away. This problem can be further compounded when multiple objects of different sizes and shapes are handled together such as in a given lot. Therefore, there is a need for material handling equipment that can handle objects of varying sizes and shapes, and that can handle such varying objects together.

Turning to FIGS. 1 to 4, a sortation system 100 is shown according to one embodiment. In general, the sortation system 100 has an induction station 102, a track system 104, at least one delivery vehicle 106 (shown in FIGS. 3 and 4), and a plurality of sort destinations 108 such as at least one set of sort destinations. In one example, the sortation system 100 can have first and second sets 108(1) and 108(2) of sort destinations. The first and second sets 108(1) and 108(2) of sort destinations can be spaced from one another along a longitudinal direction L. Further, the track system 104 can be disposed between the first and second sets 108(1) and 108(2) of sort destinations. It will be understood that, in alternative embodiments, inventory processing systems of the disclosure can have as few as one set of sort destinations or greater than one set of sort destinations. Each sort destination 108 can include a rotatable conveyor system 110 having a pair of conveyors that are angled with respect to one another as will be described in further detail below.

Each rotatable conveyor system 110 has a first conveyor end 112 and a second conveyor end 114 that are spaced from one another along the longitudinal direction L. The first conveyor end 112 can be disposed closer to the track system 104 than the second conveyor end 114. Thus, the first conveyor end 112 can be considered an inner end, and the second conveyor end 114 can be considered an outer end. The sortation system 100 can have supports (see 116a and 116b in FIG. 5) for each set 108(1) and 108(2) of sort destinations. The supports can be configured to support the conveyor systems 110.

The rotatable conveyor systems 110 can be arranged in at least one row R that extends along a transverse direction T that is perpendicular to the longitudinal direction L. For example, the conveyor systems 110 can be arranged in a plurality of rows R, where each row R extends along the transverse direction T. The conveyor systems 110 in each row R can be offset from one another along the transverse direction T. Further, the rows R can be offset from one another a vertical direction V that is perpendicular to both the transverse direction T and the longitudinal direction L.

In addition, or alternatively, the conveyor systems 110 can be arranged in at least one column C that extends along the vertical direction V. For example, the conveyor systems 110 can be arranged in a plurality of columns C, where each column C extends along the vertical direction V. The conveyor systems 110 in each column C can be offset from one another along the vertical direction V. Further, the columns C can be offset from one another along the transverse direction T. Thus, the conveyor systems 110 can be arranged in a one- or two-dimensional array of conveyor systems 110.

The sortation system 100 is configured to sort intermingled payloads into separate lots, each lot having one or more of the payloads. For example, the payloads can be inventory items or packages, and the lots can be customer orders of one or more of the inventory items or packages. As another example, the payloads can be envelopes or mailers, and the lots can be postal addresses. It will be understood that the payloads can be sorted by other criteria. Each sort destination 108 can correspond to a different lot or set of lots. The sortation system 100 includes at least one delivery vehicle 106, such as a plurality of delivery vehicles, configured to deliver payloads to the sort destinations 108, and in particular, onto the conveyor systems 110.

The induction station 102 is configured to receive intermingled payloads that are to be sorted. Each payload is identified at the induction station 102 by detecting a characteristic of the payload. A sort destination 108 in which the payload to be sorted is identified based on the detected characteristic. For example, the induction station 102 can include at least one scanner 103 configured to scan barcodes on the payloads, and the desired sort destination 108 can be the sort destination 108 for a lot that corresponds to the barcode. The induction station 102 can include a conveyor 101 that conveys the payloads to a loading position of the track system 104, where the payload is loaded onto a delivery vehicle 106.

Figure 2:
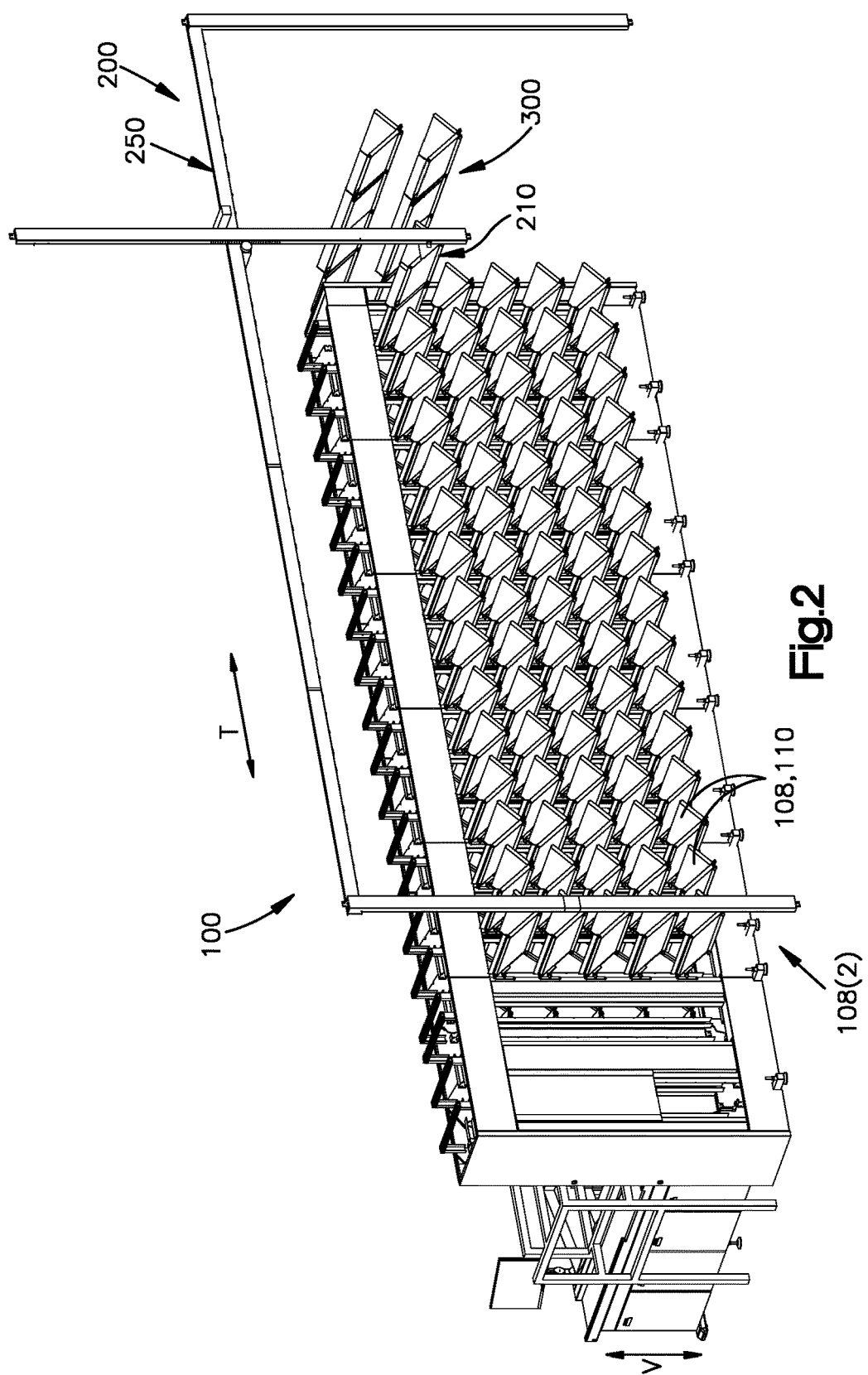
FIG. 2 shows rear perspective view of the sorting system of FIG. 1 along with a payload transfer system and first ends of a plurality of packaging systems according to one embodiment.
Figure 3:
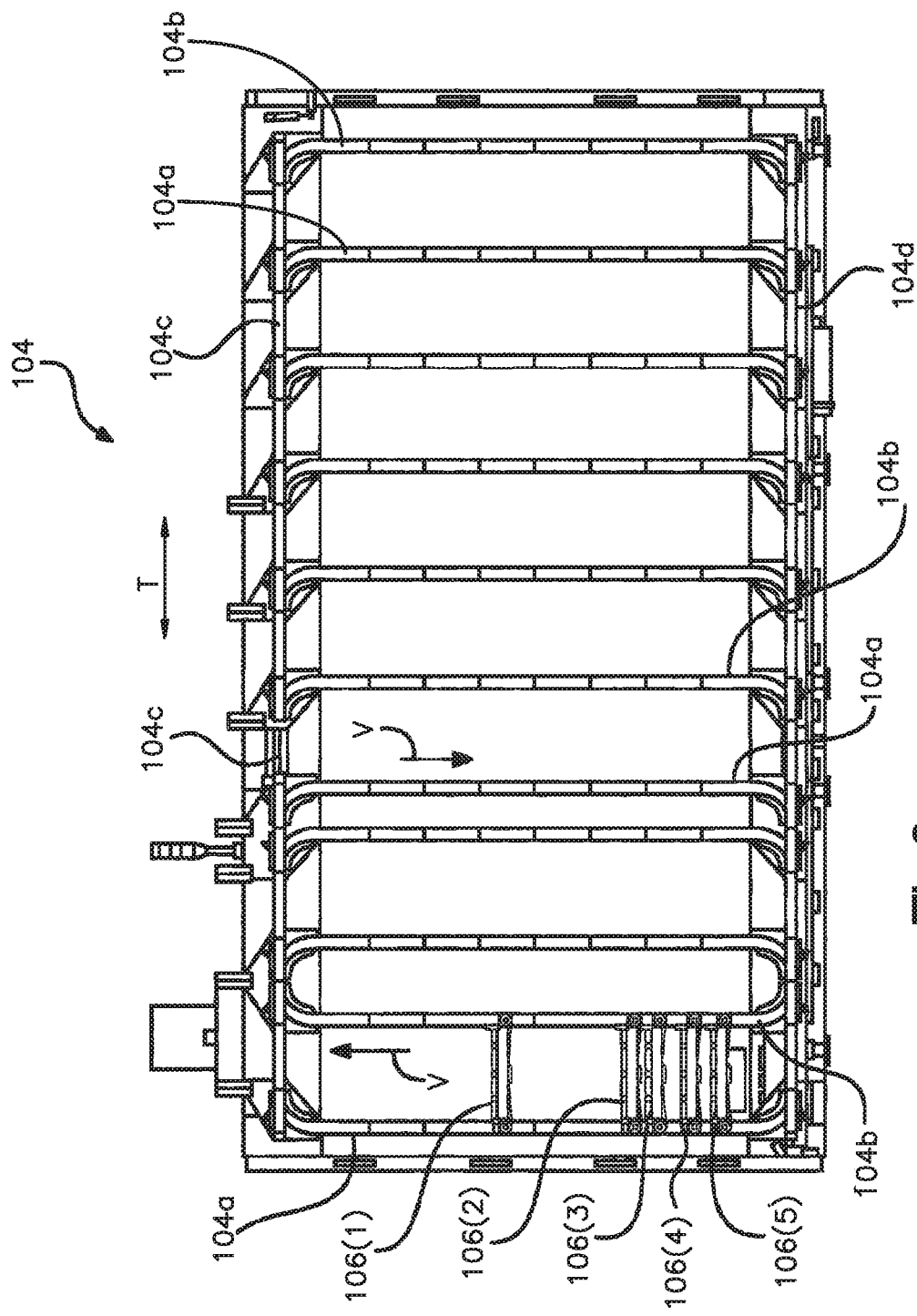
FIG. 3 shows a cross-sectional elevation view of the sorting system of FIG. 1.

With continued reference to FIGS. 1 to 3, the track system 104 can include at least one set of tracks, such as first and second sets of tracks that are spaced from one another along the longitudinal direction L. The delivery vehicles 106 are configured to ride along the track system 104 between the first and second sets of tracks. For example, each delivery vehicle 106 can have a first pair of wheels (see e.g., 106a and 106c in FIG. 4) configured to ride along the first set of tracks, and a second pair of wheels (see e.g., 106b and 106d in FIG. 4) configured to ride along the second set of tracks.

The tracks are configured to guide the delivery vehicles 106 to the sort destinations 108 along the columns C and the rows R. Each set of tracks can include a plurality of vertical tracks 104a and 104b that extend along the vertical direction V. The vertical tracks can include at least one pair of tracks 104a and 104b, and individual pairs of the tracks can correspond to a column of the sort destinations 108. The tracks 104a and 104b in each pair can be spaced from one another along the transverse direction T. Additionally, the pairs of tracks can be spaced from one another along the transverse direction T. Each set of tracks can further include a plurality of horizontal connecting tracks 104c and 104d that extend along the transverse direction T. The horizontal connecting tracks 104c and 104d can be spaced from one another along the vertical direction V, and can connect the pairs of vertical tracks 104a and 104b to one another. For example, the vertical tracks can extend from one of the connecting tracks 104c to another one of the connecting tracks 104d. It will be understood that in alternative embodiments the track system 104 can be configured in the other manners. For example, the tracks of the track system 104 can be extend along alternative paths.

Figure 4:
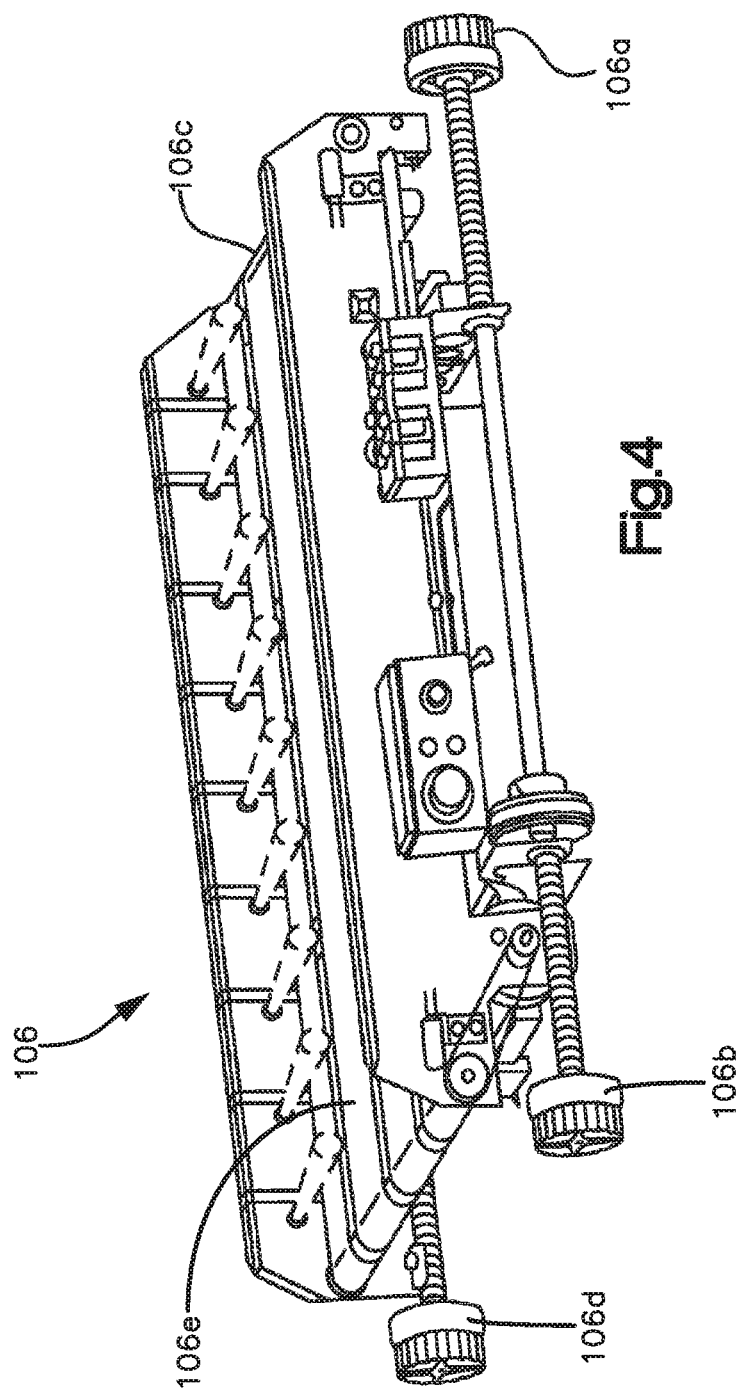
FIG. 4 shows a perspective view of a delivery vehicle of the sorting system of FIG. 1.

Referring to FIG. 4, the delivery vehicle 106 is configured to carry the payload along the track system 104 along at least one of a vertical direction V along the vertical tracks and a transverse direction T along the connecting tracks until the delivery vehicle 106 is vertically and horizontally aligned with a desired sort destination 108. The delivery vehicle 106 can be a semi-autonomous vehicle and may have an onboard power source and an onboard motor to drive the delivery vehicle 106 along the track system 104. The delivery vehicle 106 can include four wheels, including two forward wheels 106a and 106b and two rearward wheels 106c and 106d. The forward wheels 106a and 106b ride in the first tracks 104a of the first and second sets of tracks, respectively, while the rearward wheels 106b and 106d ride in the second tracks 104b of the first and second sets of tracks, respectively. The delivery vehicle 106 can include a loading/unloading mechanism 106e, such as a conveyor, for loading payloads onto the delivery vehicle 106 and discharging the items from the delivery vehicle 106 to a desired conveyor system 110 when the delivery vehicle 106 is vertically and horizontally aligned with the sort destination 108 that includes the desired conveyor system 110. Once the filling of a sort destination 108 is complete (e.g., when all payloads of a lot are sorted to the sort destination 108), the lot can be transferred from its rotatable conveyor system 110 to a human or a suitable transfer system, such as transfer system 200 (discussed below) for processing downstream of the sortation system 100.

Figure 5:
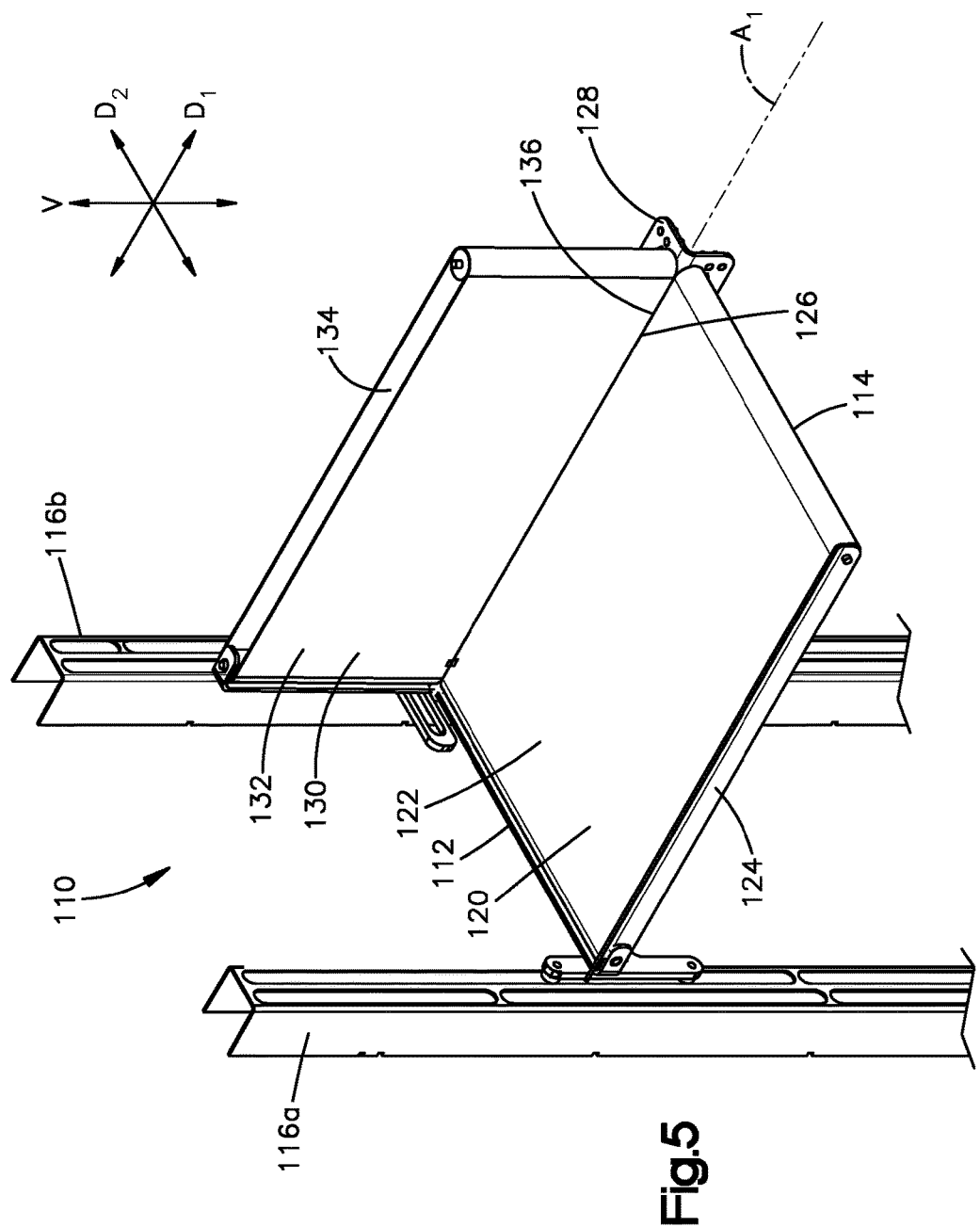
FIG. 5 shows a perspective view of a rotatable conveyor system of the sorting system of FIG. 1.
Figure 6:
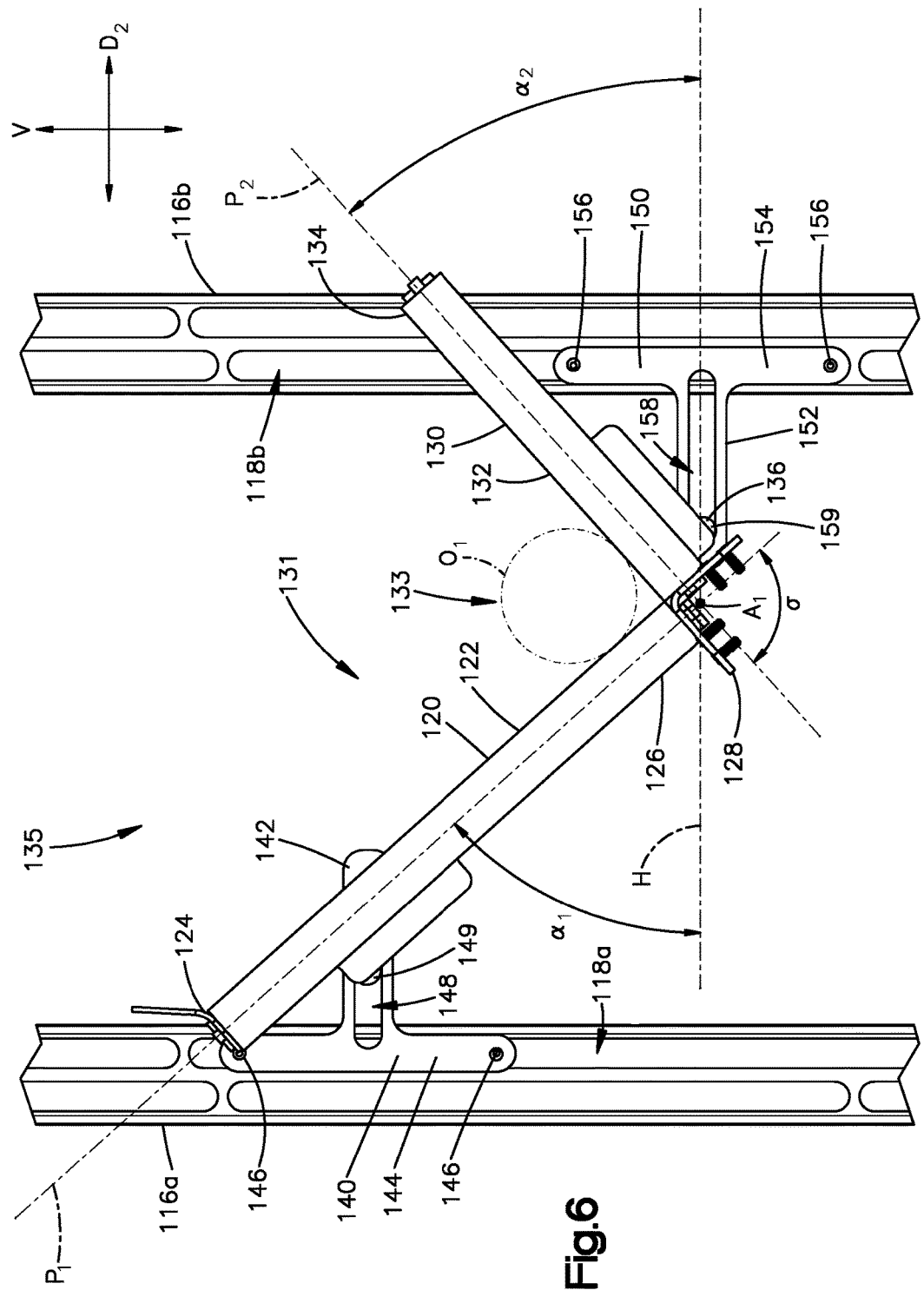
FIG. 6 shows an elevation end view of the rotatable conveyor system of FIG. 5 in a first orientation.
Figure 7:
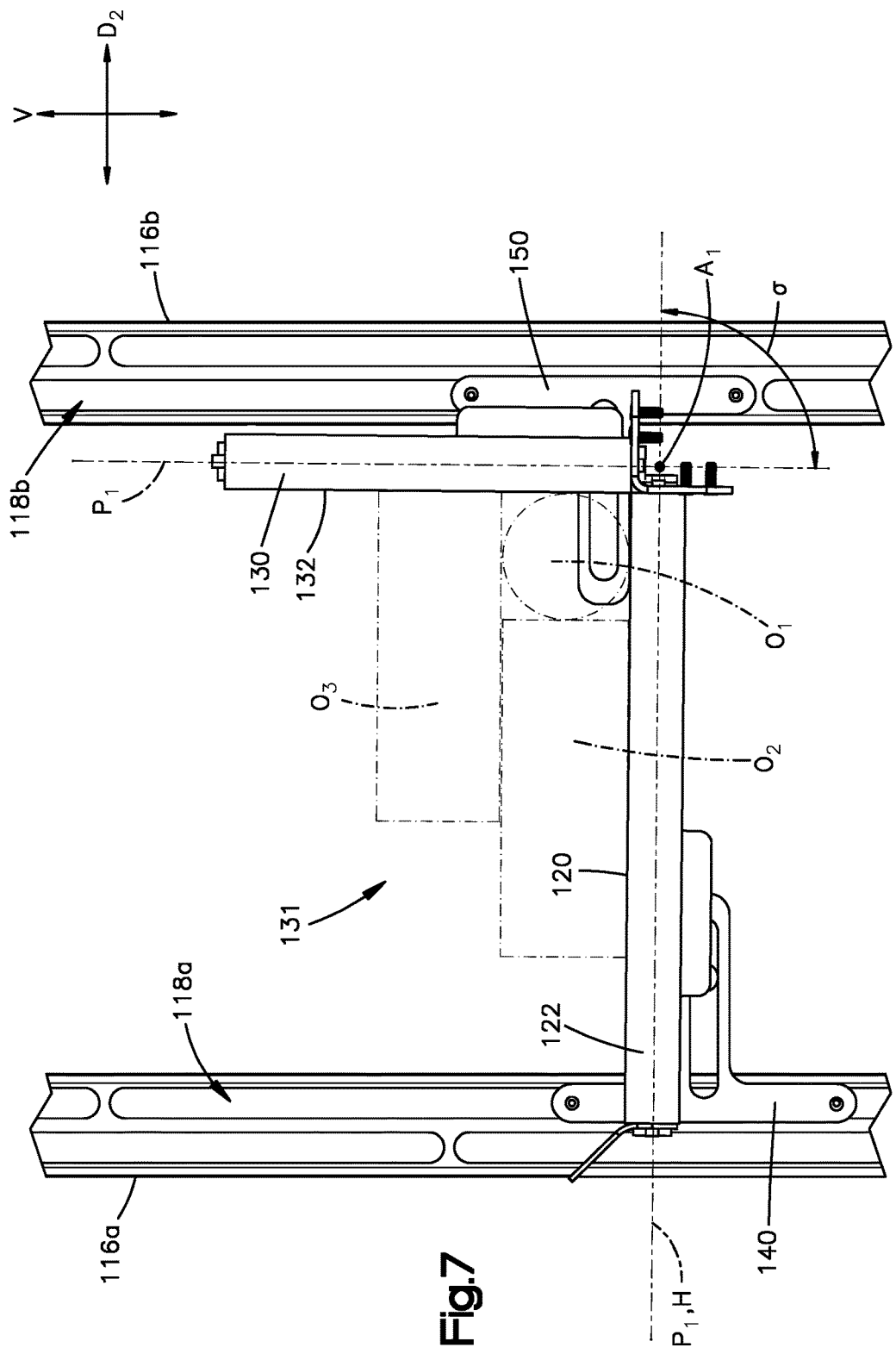
FIG. 7 shows an elevation end view of the rotatable conveyor system of FIG. 5 in a second orientation.

Turning to FIGS. 5 to 7, a rotatable conveyor system 110 is shown according to one embodiment. The conveyor system 110 can be implemented in the sortation system 100 of FIG. 1, and in such examples, can be referred to as a sortation conveyor system 110. In alternative examples, the conveyor system 110 can be implemented in systems other than the sortation system 100 and can be implemented with or without other instances of the conveyor system 110. The conveyor system 110 comprises a first conveyor end 112 and a second conveyor end 114 that are offset from one another along a first direction $D_1$. The first direction $D_1$ can be a first horizontal direction. When implemented in the sortation system 100 of FIG. 1, the first direction $D_1$ can be the longitudinal direction L. The conveyor system 110 has a first conveyor 120 and a second conveyor 130 that are angularly offset from one another. In at least one example, the first and second conveyors 120 and 130 can define a "V" shape or a truncated or modified "V" shape as discussed below.

In general, the rotatable conveyor system 110 can rotate between a first orientation shown in FIG. 6 and a second orientation shown in FIG. 7 as payloads are loaded onto the conveyor system 110 so as to accommodate differently sized and/or shaped payloads. In the first orientation, the conveyor system 110 can function as a cradle that supports items received thereon. Thus, in the first orientation, the conveyor system 110 can cradle payloads having curved or rounded surfaces to prevent such payloads from rolling off of the conveyor system 110. In the second orientation, the conveyor system 110 can provide a substantially horizontal surface that supports items received thereon. Thus, in the second orientation, payloads with flat surfaces can lay flat on a substantially horizontal surface of the conveyor system 110.

The first conveyor 120 has a first conveyor surface 122 configured to carry payloads between the first and second conveyor ends 112 and 114 along the first direction $D_1$. The first conveyor 120 has a first conveyor side 124 and a second conveyor side 126 that are offset from one another and that extend between the first and second conveyor ends 112 and 114. The first conveyor side 124 can be considered to be an outer side, and the second conveyor side 126 can be considered to be an inner side. The first conveyor surface 122 can be defined by a conveyor belt. In alternative embodiments, the first conveyor surface 122 can be defined by any other suitable conveyor element configured to translate payloads such as tracks, belts, rollers, skate wheels, balls, any other suitable conveyor element, or any suitable combination of conveyor elements. The conveyor elements can be powered so as to move payloads along the first direction $D_1$. The first conveyor surface 122 can define an inner surface of the "V" shape or truncated "V" shape.

The second conveyor 130 has a second conveyor surface 132 configured to carry payloads between the first and second conveyor ends 112 and 114 along the first direction $D_1$. The second conveyor 130 has a first conveyor side 134 and a second conveyor side 136 that are offset from one another and that extend between the first and second conveyor ends 112 and 114. The first conveyor side 134 can be considered to be an outer side, and the second conveyor side 136 can be considered to be an inner side. The second conveyor surface 132 can be defined by a conveyor belt. In alternative embodiments, the second conveyor surface 132 can be defined by any other suitable conveyor element configured to translate payloads such as tracks, belts, rollers, skate wheels, balls, any other suitable conveyor element, or any suitable combination of conveyor elements. The conveyor elements can be powered so as to move payloads along the first direction $D_1$. Preferably, the second conveyor surface 132 is configured to move at the same speed as the first conveyor surface 122; however, embodiments of the disclosure are not so limited. The second conveyor surface 132 can define an inner surface of the "V" shape or truncated "V" shape.

In one embodiment, the second conveyor surface 132 can have a width from its first conveyor side 134 to its second conveyor side 136 that is less than a width of the first conveyor surface 120 from its first conveyor side 124 to its second conveyor side 126. However, in alternative embodiments, the widths of the first and second conveyor surfaces 120 and 130 can be equal or the width of the first conveyor surface 120 can be less than the width of the second conveyor surface 130.

The first conveyor 120 defines a first plane $P_1$ (shown in FIGS. 6 and 7) that extends between the first and second conveyor ends 112 and 114 and between the first and second conveyor sides 124 and 126. The second conveyor 130 defines a second plane $P_2$ (shown in FIGS. 6 and 7) that extends between the first and second conveyor ends 112 and 114 and between the first and second conveyor sides 134 and 136. The first and second conveyors 120 and 130 are coupled to one another in a side-by-side arrangement so as to define an inner angle θ between the first and second conveyors 120 and 130. The first and second conveyors 120 and 130 are coupled to one another such that the second conveyor sides 126 and 136 are spaced closer to one another than the first conveyor sides 124 and 134. Stated differently, a distance between the second conveyor sides 126 and 136 is smaller than a distance between the first conveyor sides 124 and 134.

The angle θ can be defined from the first conveyor surface 122 to the second conveyor surface 132. Alternatively, the angle θ can be defined from the first plane $P_1$ to the second plane $P_2$. The angle θ is less than 180 degrees. For example, the angle can be between 45 degrees and 135 degrees. As another example, the angle θ can be approximately 90 degrees, such as within ±10 degrees. The first and second conveyors 120 and 130 can be fixedly coupled to one another such that the angle θ is fixed. In one example, the conveyor system 110 can include at least one support 128 such as a bracket that attaches the first and second conveyors 120 and 130 to one another. In alternative embodiments, the first and second conveyors 120 and 130 can be coupled to one another such that the angle θ can be adjusted.

In some examples, the second conveyor sides 126 and 136 of the first and second conveyors 120 and 130 can be directly coupled to one another, while the first conveyor sides 124 and 134 can be spaced from one another. Thus, the distance between the second conveyor sides 126 and 136 can be substantially zero. In other examples, the distance between the second conveyor sides 126 and 136 can be greater than zero. Thus, the conveyor system 110 can define a modified or truncated "V" shape, where the point of the "V" is cut off. In at least some such other examples, the conveyor system 110 can include a connecting member that extends between the second sides 126 and 136, such as from the second side 126 to the second side 136. The connecting member can be a conveyor having a conveyor surface or can define any other suitable surface.

The first and second conveyors 120 and 130 can define a recess 131 therebetween. The recess 131 can have a valley 133 and an upper end 135 that are opposite from one another. The recess 131 can define an opening at the upper end 135 between the first and second conveyor ends 112 and 114. The recess 131 can be configured to support one or more objects (e.g., object $O_1$ in FIG. 6) in the valley 133. The valley 133 can be adjacent the second conveyor sides 126 and 136. In the first orientation (shown in FIG. 6), the valley 133 can be disposed entirely below the upper end 135. In the second orientation (shown in FIG. 7), the valley 133 can be aligned with at least a portion of the open end 135 along a second horizontal direction $D_2$, that is perpendicular to the first horizontal direction $D_1$.

Each of the first and second conveyors 120 and 130 can define an angle $\alpha_1$ or $\alpha_2$ with respect to a horizontal plane H when the conveyor system 110 is in the first orientation. Note that the angles $\alpha_1$ or $\alpha_2$ may, but are not required to, be equal. Each angle $\alpha_1$ and $\alpha_2$ may be between zero and 90 degrees. In one example, at least one of the angles $\alpha_1$ and $\alpha_2$ may be approximately 45 degrees, such as within ±10 degrees. In another example, at least one of the angles $\alpha_1$ and $\alpha_2$ may be approximately 25 degrees, such as within ±10 degrees. Each of the first and second conveyors 120 and 130 can define a second angle with respect to the horizontal plane H when the conveyor system is in the second orientation 110, where the second angles are different from their respective angles $\alpha_1$ and $\alpha_2$. In one example, the "V" or truncated "V" shape can be upright such that both the first and second conveyors 120 and 130 are angularly offset from a horizontal plane H when the conveyor system 110 is in the first orientation, and rotated such that one of the first and second conveyors 120 and 130 is substantially horizontal or aligned with the horizontal plane H when the conveyor system 110 is in the second orientation.

The conveyor system 110 can be configured to rotate about an axis $A_1$ that extends along the first direction $D_1$. The axis $A_1$ can be defined by the intersection of the first and second planes $P_1$ and $P_2$, or can be offset from the intersection. Rotation of one of the first and second conveyors 120 and 130 can correspondingly rotate the other one of the first and second conveyors 120 and 130. Thus, the first and second conveyors 120 and 130 can be rotationally fixed relative to one another. The conveyor system 110 can be configured such that the axis $A_1$ translates in at least one of a vertical direction V and the second horizontal direction $D_2$, as the conveyor system transitions between the first and second orientations shown in FIGS. 6 and 7. Thus, the conveyor system 110 can further be configured to translate as it transitions between the first and second orientations.

The conveyor system 110 can include at least one coupling, such as first and second couplings 140 and 150. Each coupling can be configured to couple a respective one of the first and second conveyors 120 and 130 of the conveyor system 110 to a support. For instance, the first coupling 140 can be configured to couple the first conveyor 120 to a first support 116a, and the second coupling 140 can be configured to couple the second conveyor 130 to a second support 116b. The first and second supports 116a and 116b can define guides or rails that guide movement of the first and second couplings 140 and 150 so as to transition the conveyor system 110 between the first and second orientations. The first and second supports 116a and 116b can be offset from one another along the second direction $D_2$. Further, each support 116a and 116b can be elongate along the vertical direction V. The couplings 140 and 150 can be configured to move relative to their respective supports 116a and 116b so as to transition the conveyor system 110 between the first and second orientations. For example the conveyor system 110 can include at least one actuator (not shown) that is configured to move the couplings 140 and 150 so as to cause the conveyors 120 and 130 to rotate. The at least one actuator can be any suitable actuator, such as (without limitation) a motor that drives a wheel or wheels of one of the couplers 140 and 150, a linear actuator, a ball screw actuator, a gear or sprocket that drives a belt, chain, or another gear, and so on.

FIGS. 5-7 show one example of the first and second couplings 140 and 150. It will be understood that other couplings are contemplated within the scope of this disclosure. As shown, the first coupling 140 can be a bracket. In one example, the first coupling 140 can have a "T" shape; however, the first coupling 140 can have other suitable shapes. The first coupling 140 has a conveyor engagement portion 142 and a track engagement portion 144. The conveyor engagement portion 142 can define a leg or trunk of the "T" shape, and the track engagement portion 144 can define a top of the "T" shape. The a track engagement portion 144 can extend along the vertical direction V, and the conveyor engagement portion 142 can extend from the track engagement portion 144 along the second direction $D_2$. Thus, the "T" shape can be rotated by 90 degrees.

The track engagement portion 144 can include at least one track engagement feature 146 that is configured to ride along a track 118a defined in the first support 116a. For example, the at least one track engagement feature 146 can include at least one wheel or roller, such as a pair of wheels or rollers 146, that are configured to ride along the track 118a defined in the first support 116a. The track 118a can be elongate along the vertical direction V. The track 118a can define a slot that extends into the first structural support 116a. Thus, the at least one wheel or roller 146 can be configured to ride within the slot defined by the track 118a along the vertical direction V.

The conveyor engagement portion 142 can define a track 148. The track 148 can be elongate along the second direction $D_2$. The track 148 can define a slot that extends into the conveyor engagement portion 142 of the first coupling 140. The conveyor system 110 can include at least one track engagement feature 149 that is attached to the first conveyor 120 and configured to ride along a track 148. For example, the at least one track engagement feature 149 can include at least one wheel or roller that is attached to the first conveyor 120. The at least one wheel or roller 149 can be configured to ride within the slot defined by the track 148 along the second direction $D_2$.

Similarly, the second coupling 150 can be a bracket. In one example, the second coupling 150 can have a "T" shape; however, the second coupling 150 can have other suitable shapes. The second coupling 150 has a conveyor engagement portion 152 and a track engagement portion 154. The conveyor engagement portion 152 can define a leg or trunk of the "T" shape, and the track engagement portion 154 can define a top of the "T" shape. The a track engagement portion 154 can extend along the vertical direction V, and the conveyor engagement portion 152 can extend from the track engagement portion 154 along the second direction $D_2$. Thus, the "T" shape can be rotated by 90 degrees.

The track engagement portion 154 can include at least one track engagement feature 156 that is configured to ride along a track 118b defined in the second structural support 116b. For example, the at least one track engagement feature 156 can include at least one wheel or roller, such as a pair of wheels or rollers 156, that are configured to ride along the track 118b defined in the second support 116b. The track 118b can be elongate along the vertical direction V. The track 118b can define a slot that extends into the second support 116b. Thus, the at least one wheel or roller 156 can be configured to ride within the slot defined by the track 118b along the vertical direction V.

The conveyor engagement portion 152 can define a track 158. The track 158 can be elongate along the second direction $D_2$. The track 158 can define a slot that extends into the conveyor engagement portion 152 of the second coupling 150. The conveyor system 110 can include at least one track engagement feature 159 that is attached to the second conveyor 130 and configured to ride along a track 158. For example, the at least one track engagement feature 159 can include at least one wheel or roller that is attached to the second conveyor 130. The at least one wheel or roller 159 can be configured to ride within the slot defined by the track 158 along the second direction $D_2$.

Referring more specifically to FIGS. 1, 6, and 7, a method of operating the sortation system 100 and the conveyor system 110 will now be described. In operation, a payload (e.g., object $O_1$) for a first lot is received at the induction station 102. The payload is scanned by the scanner 103 to identify the payload, and a controller 105 identifies a sort destination 108 for the payload. For example, the controller 105 can identify a destination conveyor system 110 from the plurality of conveyor systems 110 arranged in one or more of (i) the at least one row R that extends along the second direction $D_2$, and (ii) the at least one column C that extends along the vertical direction V. The controller 105 and/or scanner 103 can additionally determine at least one physical characteristic of the payload such as at least one of a size and a shape of the payload.

The controller 105 determines an orientation of the destination conveyor system 110 based on the at least one physical characteristic, such as at least one of (i) the size of the payload, (ii) the shape of the payload. The controller 105 can further determine the orientation based on whether one or more other payloads are already supported at the sort destination. The controller 105 can select one of the first and second orientations based on this information. Further, the controller 105 can control the conveyor system 110 so as to ensure that the conveyor system 110 is in the determined orientation. This can include rotating the conveyor system 110 from one of the first and second orientations to the other of the first and second orientations. Alternatively, this can include maintaining the conveyor system 110 in the determined orientation if the conveyor system 110 is already in the determined orientation.

The payload is loaded onto a delivery vehicle 106. For example, the payload can be supported by the conveyor surface 106e of the delivery vehicle 106. The delivery vehicle 106 is moved along the tracks of the sortation system 100 until the delivery vehicle 106 is aligned with the identified conveyor system 110. For example, the delivery vehicle 106 can move along one or more of (i) the at least one row R that extends along the second direction $D_2$, and (ii) the at least one column C that extends along the vertical direction V. The delivery vehicle discharges the payload to the recess 131 of the conveyor system 110. In so doing, the delivery vehicle 106 delivers the payload to the first conveyor end 112. The controller 105 can control movement of the conveyor surfaces 122 and 132 in a direction from the first conveyor end 112 to the second conveyor end 114 so as to assist in movement of the payload onto the conveyor system 110. In some instances, the method can comprise delivering at least one subsequent payload (e.g., objects $O_2$ and $O_3$) to the identified conveyor system 110. For each subsequent payload, the method can comprise repeating the method above. To deliver a subsequent payload, it may be necessary for the delivery vehicle 106 to stop at a higher location relative to the conveyor system 110 so as to deliver the subsequent payload on top of the previous payload. Once all payloads for a lot have been received by the conveyor system 110, the conveyor system 110 can move its conveyor surfaces 122 and 132 in a direction from the first conveyor end 112 to the second conveyor end 114 so as to discharge the payloads for processing downstream of the conveyor system 110.

By rotating the conveyor system 110 to accommodate differently sized and/or shaped payloads, the payloads in a lot can be arranged in a compacted arrangement on the conveyor system 110 to limit or minimize the volume that the payloads occupy together. Limiting the volume can be advantageous when the payloads are packaged together. In particular, limiting the volume of the payloads can limit the amount of packaging that is needed to package the payloads together. However, the payloads must be delivered to packaging equipment in the compacted arrangement in order to realize the benefits of limited packaging. The following discussion relates to a packaging system 300 configured to package the payloads in the compacted arrangement and a transfer system 200 that can transfer payloads in the compacted arrangement from the sortation station 100 to the packaging system 300 in the compacted arrangement.

Turning now to FIGS. 2 and 8 to 10, a payload transfer system 200 is shown according to one embodiment. Although a single payload transfer system 200 is shown in FIG. 2, it will be understood that more than one payload transfer system 200 can be employed. For example, a second payload transfer system can service the plurality of conveyors 108(1) of FIG. 1. The payload transfer system 200 can be used with the sortation system 100 and at least one packaging system 300, such as a plurality of packaging systems 300 arranged in at least one column as shown or at least one row; however, it will be understood that the transfer system 200 can be used with material handling systems other than the sortation system 100 and the packaging system 300.

In general, the payload transfer system 200 comprises a conveyor system 210, and a conveyor movement system 250 that is configured to translate the conveyor system 210 along at least one, such as both, of the vertical direction V and the transverse direction T. The payload transfer system 200 is configured to transfer payloads from a first material handling system, such as the sortation system 100, to a second material handling system, such as a packaging system 300 (discussed below in relation to FIG. 11). For example, the conveyor movement system 250 can be configured to move the conveyor system 210 along the rows R and/or columns C of the sortation system 100 so as to selectively align the conveyor system 210 with one of the rotatable conveyor systems 110 of the sortation system 100. The rotatable conveyor system 110 can transfer at least one payload to the conveyor system 210 of the transfer system 200, and the conveyor movement system 250 can translate the conveyor system 210 so as to align the conveyor system 210 with a packaging conveyor system 310 of one of the packaging systems 300. The transfer system 200 can then transfer the at least one payload to the packaging conveyor system 310.

Figure 10:
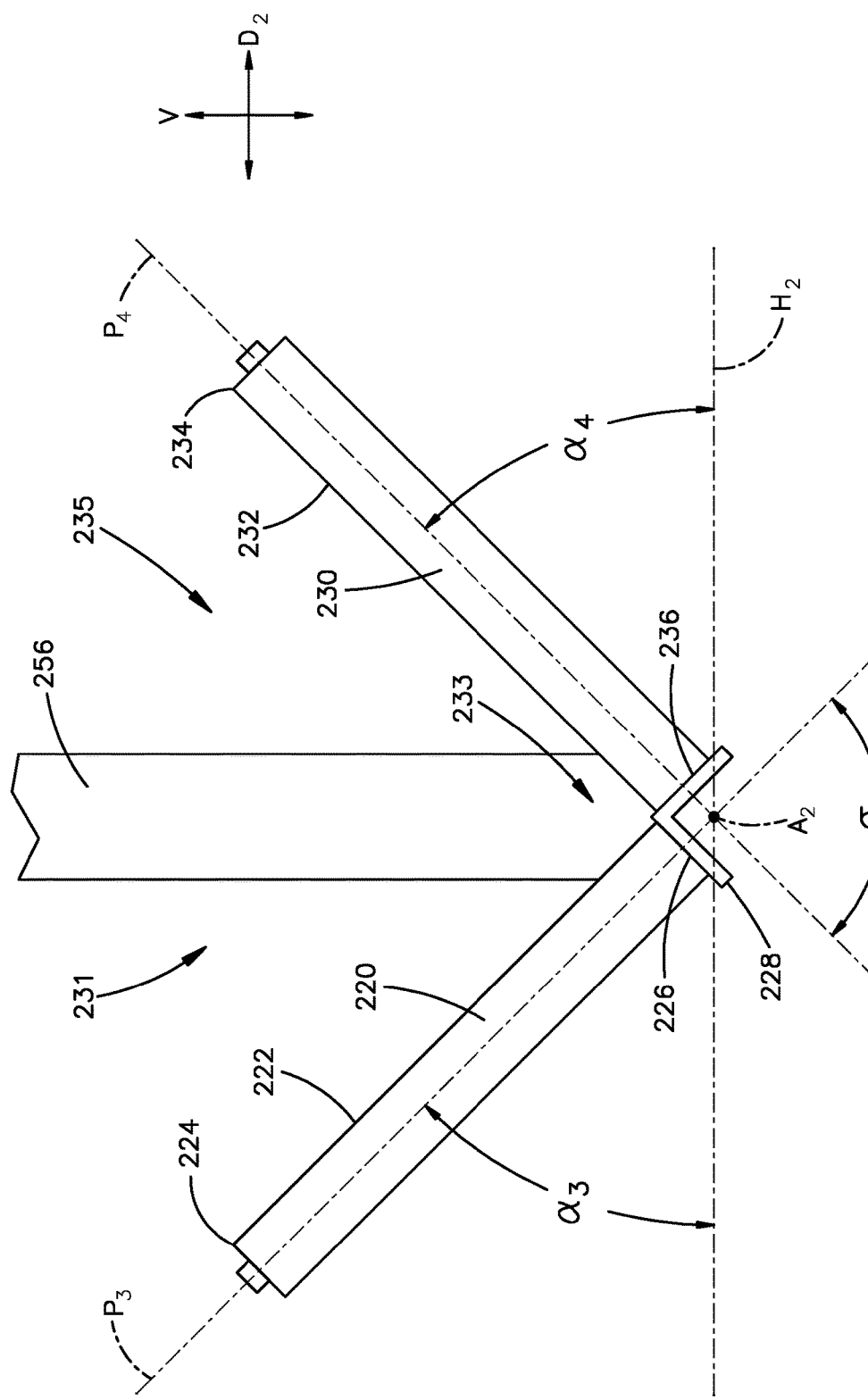
FIG. 10 shows an elevation end view of the conveyor system of the payload transfer system of FIGS. 8 and 9.

Referring more specifically to FIG. 10, the conveyor system 210 can be similar to the conveyor system 110 of FIGS. 5-7, except that the conveyor system 210 can be rotationally fixed about the first direction $D_1$ so as to remain in an upright position. The conveyor system 210 comprises a first conveyor end 212 and a second conveyor end 214 that are offset from one another along the first direction $D_1$. The conveyor system 210 has a first conveyor 220 and a second conveyor 230 that are angularly offset from one another. In at least one example, the first and second conveyors 220 and 230 can define a "V" shape or a truncated or modified "V" shape as discussed below. Thus, the conveyor system 210 can function as a cradle that supports items received thereon. For example, the conveyor system 210 can cradle payloads having curved or rounded surfaces to prevent such payloads from rolling off of the conveyor system 210.

The first conveyor 220 has a first conveyor surface 222 configured to carry payloads between the first and second conveyor ends 212 and 214 along the first direction $D_1$. The first conveyor 220 has a first conveyor side 224 and a second conveyor side 226 that are offset from one another and that extend between the first and second conveyor ends 212 and 214. The first conveyor side 224 can be considered to be an outer side, and the second conveyor side 226 can be considered to be an inner side. The first conveyor surface 222 can be defined by a conveyor belt. In alternative embodiments, the first conveyor surface 222 can be defined by any other suitable conveyor element configured to translate payloads such as tracks, belts, rollers, skate wheels, balls, any other suitable conveyor element, or any suitable combination of conveyor elements. The conveyor elements can be powered so as to move payloads along the first direction $D_1$. The first conveyor surface 222 can define an inner surface of the "V" shape or truncated "V" shape.

The second conveyor 230 has a second conveyor surface 232 configured to carry payloads between the first and second conveyor ends 212 and 214 along the first direction $D_1$. The second conveyor 230 has a first conveyor side 234 and a second conveyor side 236 that are offset from one another and that extend between the first and second conveyor ends 212 and 214. The first conveyor side 234 can be considered to be an outer side, and the second conveyor side 236 can be considered to be an inner side. The second conveyor surface 232 can be defined by a conveyor belt. In alternative embodiments, the second conveyor surface 232 can be defined by any other suitable conveyor element configured to translate payloads such as tracks, belts, rollers, skate wheels, balls, any other suitable conveyor element, or any suitable combination of conveyor elements. The conveyor elements can be powered so as to move payloads along the first direction $D_1$. Preferably, the second conveyor surface 232 is configured to move at the same speed as the first conveyor surface 222; however, embodiments of the disclosure are not so limited. The second conveyor surface 232 can define an inner surface of the "V" shape or truncated "V" shape.

The first conveyor 220 defines a first plane $P_3$ that extends between the first and second conveyor ends 212 and 214 and between the first and second conveyor sides 224 and 226. The second conveyor 230 defines a second plane $P_4$ that extends between the first and second conveyor ends 212 and 214 and between the first and second conveyor sides 234 and 236. The first and second conveyors 220 and 230 are coupled to one another in a side-by-side arrangement so as to define an inner angle $\theta_2$ between the first and second conveyors 220 and 230. The first and second conveyors 220 and 230 are coupled to one another such that the second conveyor sides 226 and 236 are spaced closer to one another than the first conveyor sides 224 and 234. Stated differently, a distance between the second conveyor sides 226 and 236 is smaller than a distance between the first conveyor sides 224 and 234.

The angle $\theta_2$ can be defined from the first conveyor surface 222 to the second conveyor surface 232. Alternatively, the angle $\theta_2$ can be defined from the first plane $P_3$ to the second plane $P_4$. The angle $\theta_2$ is less than 180 degrees. For example, the angle can be between 45 degrees and 135 degrees. As another example, the angle $\theta_2$ can be approximately 90 degrees, such as within +10 degrees. The angle $\theta_2$ can be substantially equal to the angle $\theta$ of the rotatable conveyor system 110 of FIG. 1, although embodiments of the disclosure are not so limited. The first and second conveyors 220 and 230 can be fixedly coupled to one another such that the angle $\theta_2$ is fixed. In one example, the conveyor system 210 can include at least one support 228 such as a bracket that attaches the first and second conveyors 220 and 230 to one another. In alternative embodiments, the first and second conveyors 120 and 130 can be coupled to one another such that the angle $\theta$ can be adjusted.

In some examples, the second conveyor sides 226 and 236 of the first and second conveyors 220 and 230 can be directly coupled to one another, while the first conveyor sides 224 and 234 can be spaced from one another. Thus, the distance between the second conveyor sides 226 and 236 can be substantially zero. In other examples, the distance between the second conveyor sides 226 and 236 can be greater than zero. Thus, the conveyor system 210 can define a modified or truncated "V" shape, where the point of the "V" is cut off. In at least some such other examples, the conveyor system 210 can include a connecting member that extends between the second sides 226 and 236, such as from the second side 226 to the second side 236. The connecting member can be a conveyor having a conveyor surface or can define any other suitable surface.

The first and second conveyors 220 and 230 can define a recess 231 therebetween. The recess 231 can have a lower end 233 and an upper end 235 that are opposite from one another. The lower end 233 can define a valley. The upper end 235 can define an opening between the first sides 224 and 234. The recess 231 can be configured to support one or more objects in the valley. The valley can be adjacent the second conveyor sides 226 and 236. The valley can be disposed entirely below the upper end.

Each of the first and second conveyors 220 and 230 can define an angle $\alpha_3$ or $\alpha_4$ with respect to a horizontal plane $H_2$. Each angle $\alpha_3$ and $\alpha_4$ may be between zero and 90 degrees. In one example, at least one of the angles $\alpha_3$ and $\alpha_4$ may approximately 45 degrees, such as within ±10 degrees. In another example, at least one of the angles $\alpha_3$ and $\alpha_4$ may approximately 25 degrees, such as within ±10 degrees. Thus, the "V" shape or truncated "V" shape can be upright such that both the first and second conveyors 220 and 230 are angularly offset from the horizontal plane $H_2$.

Referring back to FIGS. 8 and 9, the conveyor movement system 250 can support the conveyor system 210 such that the conveyor system 210 is fixed in an upright position with lower end 233 of the recess 231 always being spaced below the upper end 235. Thus, conveyor system 210 can be rotationally fixed with respect to the first direction $D_1$ (or longitudinal direction L) such that the conveyor system 210 is prevented from rotating about an axis that extends in the first direction $D_1$. In some embodiments, the conveyor system 210 can be prevented from rotating about an axis that extends in the vertical direction V. In other embodiments, the conveyor system 210 can be configured to rotate about an axis that extends in the vertical direction V, such as along an axis that extends along the arm 256. Such rotation might be advantageous when, for example, the packaging system 300 is on the opposite side of the transfer system 200 from the sortation system 100 (i.e., the transfer system 200 is between the sortation system 100 and the packaging system 300).

The conveyor movement system 250 is configured to translate the conveyor system 210 along at least one of the vertical direction V and the transverse direction T, such as along both the vertical direction V and the transverse direction T. In some embodiments, the conveyor movement system 250 can be configured such that the conveyor movement system 250 does not move the conveyor system 210 along the longitudinal direction L. Thus, the conveyor movement system 250 can be configured to move the conveyor system 210 along a plane that extends along the vertical direction V and the transverse direction T, but is prevented from moving the conveyor system 210 along any other plane that is angularly offset from the plane.

Figure 8:
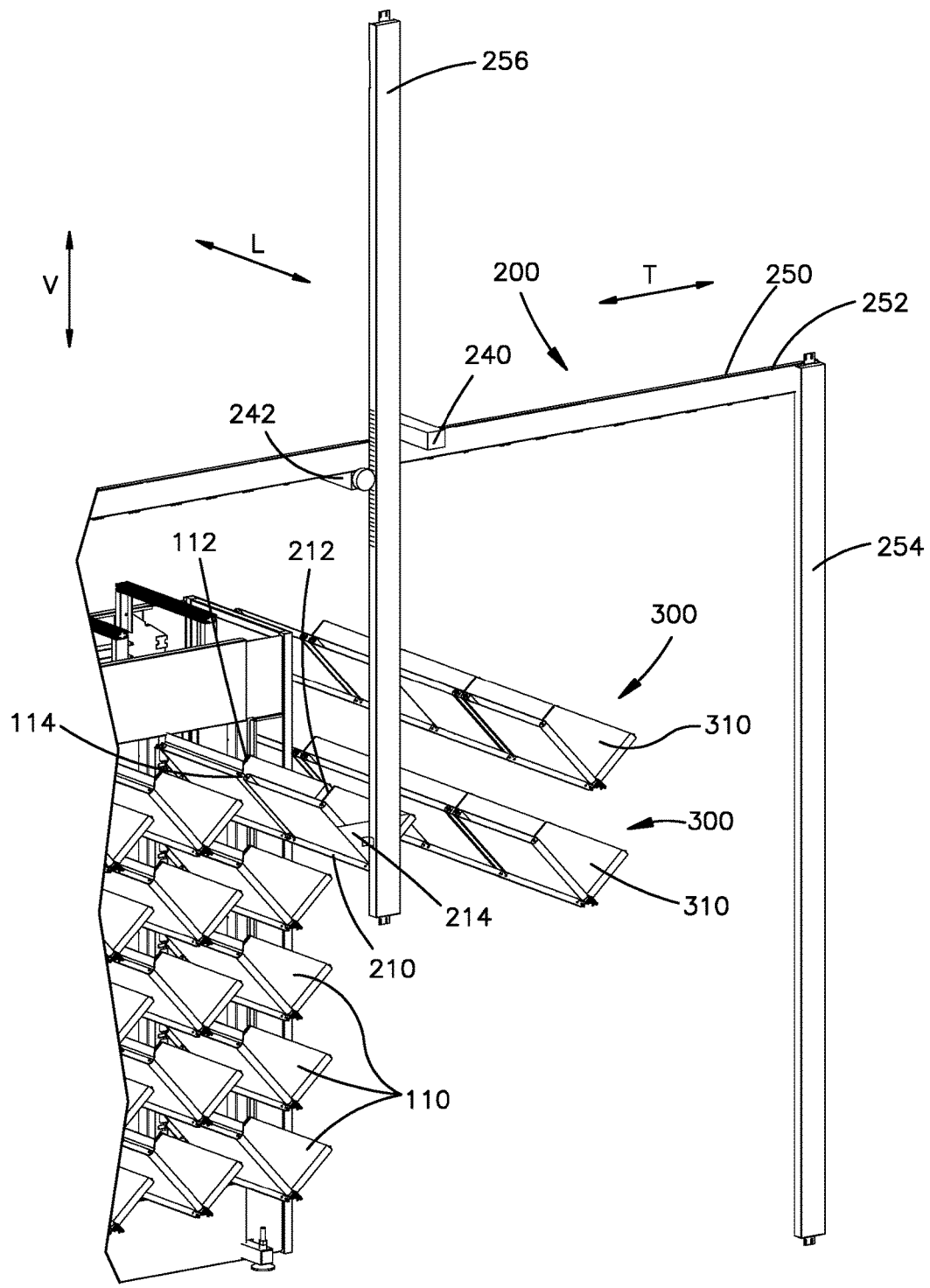
FIG. 8 shows an enlarged view of a portion of the sorting system, payload transfer system, and packaging systems of FIG. 2 with the payload transfer system positioned so as to receive a payload from a conveyor system of the sorting system.
Figure 9:
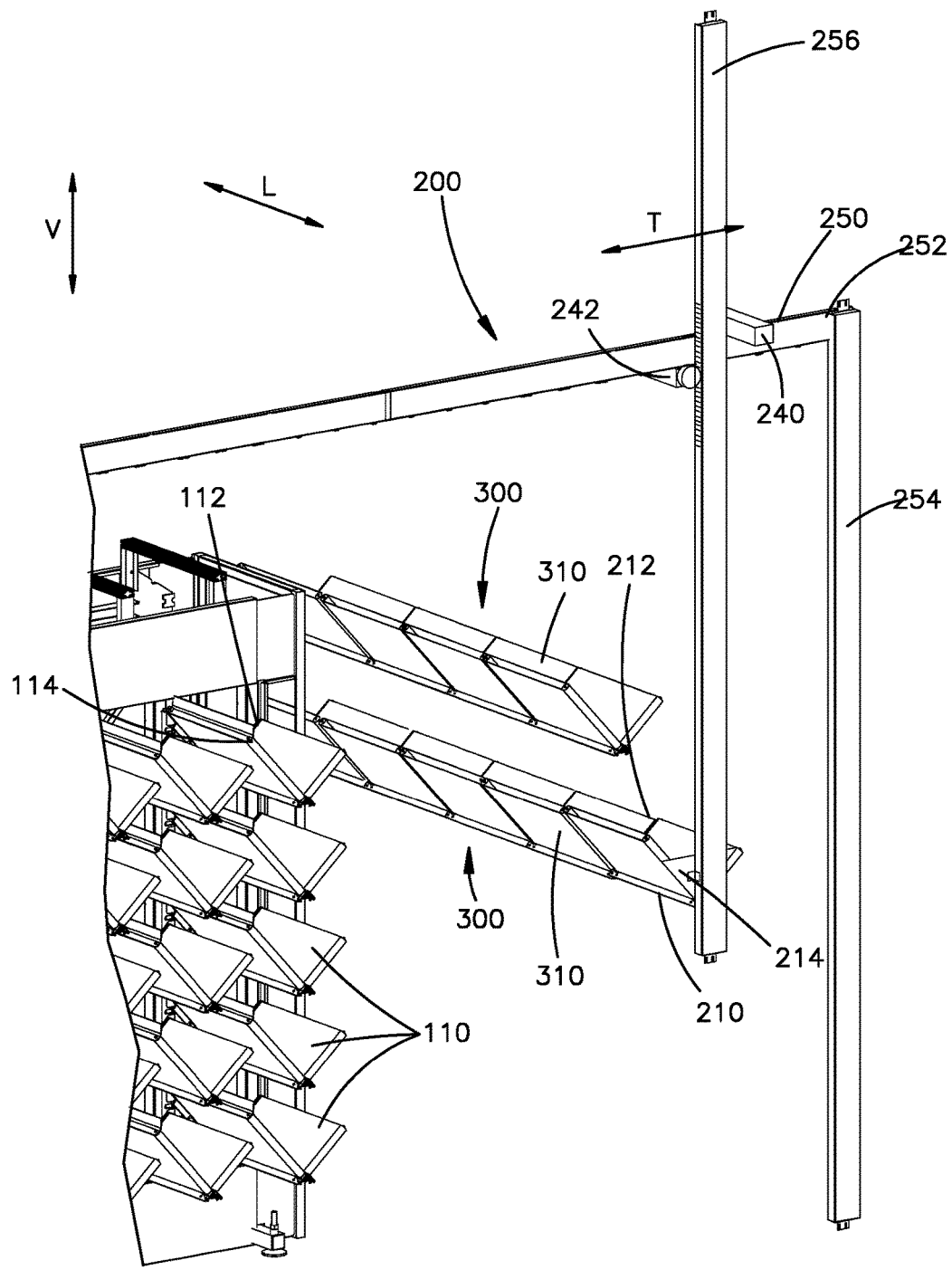
FIG. 9 shows an enlarged view of the portion of the sorting system, payload transfer system, and packaging systems of FIG. 8 with the payload transfer system positioned so as to transfer a payload to one of the packaging systems.

The conveyor movement system 250 can be any suitable material handling device that is suitable for translating the conveyor system 210 along at least one of the vertical direction V and the second direction $D_2$. FIGS. 2, 8, and 9 show on example of a conveyor movement system 250 in which the conveyor movement system 250 is implemented as a Cartesian coordinate robot such as a gantry robot. For example, the conveyor movement system 250 can be implemented in a manner similar to a model ZP-7, 2-axis, linear module gantry robot from Güdel or gantry robots from other manufacturers. However, it will be understood that other material handling devices are contemplated. For example, to service a linear array of conveyor systems 110 of FIGS. 5-7, the conveyor movement system 250 can be implemented as a linear actuator that moves the conveyor system 210 along a linear direction.

The conveyor movement system 250 has a gantry beam 252, a pair of legs 254, and an arm 256. The legs 254 are spaced from one another along the transverse direction T. The beam 252 is a linear beam that is elongate as it extends along the transverse direction T. The beam 252 is supported above the ground by the legs 254 so as to define a space between the beam 252 and the ground. Further, the beam 252 extends from one of the legs 254 to the other of the legs 254.

The arm 256 is a linear beam that is elongate as it extends along the vertical direction V. The arm 256 is supported by the beam 252 such that it extends along the vertical direction V. The conveyor system 210 is mounted to the arm 256 so as to be rotationally fixed as described above. In one example, the system 200 can include a bracket 236 that couples the conveyor system 210 to the arm 256. The conveyor movement system 250 comprises at least one actuator that is configured to move the conveyor system 210 along at least one of the vertical direction V and the transverse direction T. For example, the conveyor movement system 250 can include an actuator 240 that is configured to move the arm 256 along the beam 252 along the transverse direction T. Additionally or alternatively, the conveyor movement system 250 can include an actuator 242 that is configured move the conveyor system 210, and optionally the arm 256, and along the vertical direction V. In one example, the conveyor system 210 can be translationally fixed to the arm 256, and the actuator 242 can be configured to translate the arm 256 along the vertical direction V so as to cause corresponding movement of the conveyor system 210 along the vertical direction V. In another example, the conveyor system 210 can be translationally coupled to the arm 256, and the actuator 242 can be configured to translate the conveyor system 210 along the arm 256 along the vertical direction V.

Referring to FIGS. 8 and 9, in operation, a method of transferring at least one payload from a conveyor system 110 of FIG. 1 to the conveyor system 210 of FIGS. 8 and 9 will be described. For purposes of the following description and the claims, when transferring from the conveyor system 110 to the conveyor system 210, the recess 131 can be considered to be a first recess, the recess 231 can be considered to be a second recess, the conveyor system 110 can be considered to be a first conveyor system, and the conveyor system 210 can be considered to be a second conveyor system. The method can comprise a step of supporting at least one payload in the recess 131 of the conveyor system 110, where the recess 131 is defined between first and second conveyor surfaces 122 and 132 of the conveyor system 110 that are angularly offset from one another as discussed above. The supporting step can comprise any suitable method of supporting at least one payload in the recess 131, including the steps described above in relation to the sortation system 100.

For example, to support the at least one payload, a controller (e.g., 105 or other controller) can identify the first conveyor system 110 from a plurality of conveyor systems 110 arranged in one or more of (i) at least one row R that extends along the second direction $D_2$ and (ii) at least one column C that extends along a vertical direction V. The delivery vehicle 106 of the sortation system 100 can be moved along the track system 104 along the one or more of the (i) at least one row R and (ii) at least one column C so as to position the delivery vehicle 106 adjacent to the recess 131 of the conveyor system 110. Then the payload can be discharged from the delivery vehicle 106 to the recess 131 of the conveyor system 110. As described above, the conveyor system 110 can also be rotated along the axis $A_1$ that extends along the first direction $D_1$ before discharging the at least one payload to the recess 131 of the conveyor system 110.

When a lot of one of the conveyor systems 110 is fulfilled, the conveyor movement system 250 can move the conveyor system 210 along at least one of the vertical direction V and the transverse direction T until the recess 231 of the conveyor system 210 is aligned with the recess 131 of the conveyor system 110 along the longitudinal direction L. For example, the conveyor movement system 250 can move the conveyor 210 until its first conveyor end 212 is positioned end-to-end with the second conveyor end 214 of the sortation conveyor system 110. In moving the conveyor system 250, a controller (e.g., 205 or other controller) can identify the conveyor system 110 from the plurality of conveyor systems 110 arranged in one or more of (i) the at least one row R that extends along a second direction $D_2$, and (ii) the at least one column C that extends along the vertical direction V. The conveyor system 210 can be moved along one or more of the (i) at least one row R and (ii) at least one column C so as to align the recess 231 of conveyor system 210 with the recess 131 of the conveyor system 110. In some embodiments in which the gantry robot is employed, this moving step can comprise moving the arm 256 of the gantry robot that supports the conveyor system 210 along at least one of the second direction $D_2$ and the vertical direction V so as to align the recess 231 of conveyor system 210 with the recess 131 of the conveyor system 110. For example, the arm 256 can be moved along the vertical direction V so as to move the conveyor system 210, or the conveyor system 210 can be moved along the arm 256 along the vertical direction V.

Once the conveyor systems are aligned, the conveyor system 110 can drive its conveyor surfaces 122 and 132 so as to move the at least one payload towards the recess 231 of the conveyor system 210. The conveyor system 210 can similarly drive its conveyor surfaces 222 and 232 to receive the at least one payload in the recess 231. Transfer of the at least one payload from the sortation conveyor system 110 to the conveyor system 210 can maintain the arrangement of the at least one payload. Thus, if multiple payloads are loaded onto the sortation conveyor system 110 in a compacted arrangement, the payloads can be transferred to the conveyor system 210 without substantially changing the arrangement of the payloads.

Now a method of transferring at least one payload from the conveyor system 210 to a conveyor system 310 of the packaging system 300 will be described. For purposes of the following description and the claims, when transferring from the conveyor system 210 to the packaging conveyor system 310, the recess 231 can be considered to be a second recess, the recess 331 of conveyor system 310 can be considered to be a third recess, the conveyor system 210 can be considered to be a second conveyor system, and the conveyor system 310 can be considered to be a third conveyor system. Alternatively, in instances where the transfer system 200 is not implemented with the sortation system 100, the recess 231 can be considered to be a first recess, the recess 331 can be considered to be a second recess, the conveyor system 210 can be considered to be a first conveyor system, and the conveyor system 310 can be considered to be a second conveyor system.

The method can comprise a step of supporting at least one payload in the recess 231 of the conveyor system 210, where the recess 231 is defined between the first and second conveyor surfaces 222 and 232 of the conveyor system 210 that are angularly offset from one another as discussed above. The supporting step can comprise any suitable method of supporting at least one payload in the recess 231, including the steps described in the method above.

In the method, the conveyor movement system 250 can move the conveyor system 210 along at least one of the vertical direction V and the transverse direction T until the recess 231 of the conveyor system 210 is aligned with the recess 331 of the conveyor system 310. For example, the conveyor movement system 250 can move the conveyor 210 until its first conveyor end 212 is positioned end-to-end with the second conveyor end 314 of the conveyor system 310. In moving the conveyor system 250, a controller (e.g., 205 or other controller) can identify the conveyor system 310 from a plurality of conveyor systems 310 arranged in one or more of (i) the at least one row R that extends along a second direction $D_2$, and (ii) the at least one column C that extends along the vertical direction V if multiple conveyor segments 310 are employed. In some embodiments in which the gantry robot is employed, this moving step can comprise moving the arm 256 of the gantry robot that supports the conveyor system 310 along at least one of the second direction $D_2$ and the vertical direction V so as to align the recess 231 of conveyor system 210 with the recess 331 of the conveyor system 310. For example, the arm 256 can be moved along the vertical direction V so as to move the conveyor system 210, or the conveyor system 210 can be moved along the arm 256 along the vertical direction V.

Once the conveyor systems are aligned, the conveyor system 210 can drive its conveyor surfaces 222 and 232 so as to move the at least one payload towards the recess 331 of the conveyor system 310. The conveyor system 310 can similarly drive its conveyor surfaces 322 and 332 to receive the at least one payload in the recess 331. Transfer of the at least one payload from the sortation conveyor system 210 to the conveyor system 310 can maintain the arrangement of the at least one payload. Thus, if multiple payloads are loaded onto the conveyor system 210 in a compacted arrangement, the payloads can be transferred to the conveyor system 310 without substantially changing the arrangement of the payloads. After receiving the at least one payload in the recess 331 of the packaging conveyor system 310, the first and second conveyor surfaces 322 and 332 of the conveyor system 310 can be driven so as to move the at least one payload into a packaging material. Note that movements of the conveyor transfer system 200, the conveyor system 100, and the packaging system 300 can each be controlled by at least one controller (e.g., controller 205 or other controller).

Figure 11:
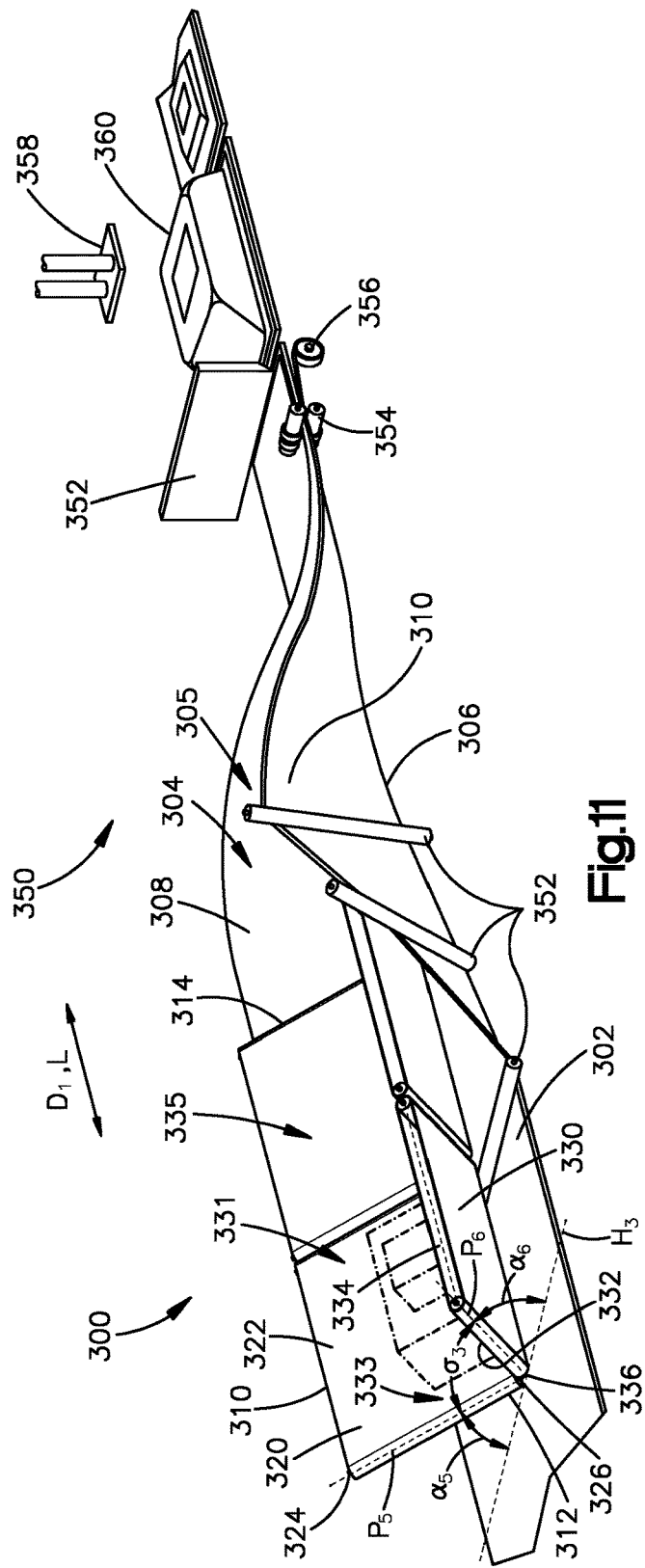
FIG. 11 shows a schematic diagram of a packaging system according to one embodiment.

Turning now to FIG. 11, a schematic diagram of one of the packaging systems 300 of FIG. 2 is shown. Note that FIG. 2 shows a first end of a plurality of instances of the packaging system 300, which are stacked over one another in a column. It will be understood that embodiments of the disclosure can include as few as one instance of the packaging system 300 or a plurality of instances of the packaging system. Multiple instances of the packaging system 300 can be arranged in at least one row or at least one column. Further, each packaging system 300 can be serviced by one or more payload transfer systems 200. The packaging system 300 can be used with the sortation system 100 and payload transfer system 200 as shown; however, it will be understood that the packaging system 300 can be used with material handling systems other than the sortation system 100 and the transfer system 200.

The packaging system 300 comprises a packaging conveyor system 310 and a packaging material handler 350. The packaging material handler 350 is configured to support a packaging material adjacent a discharge end of the conveyor system 310. In general, the packaging conveyor system 310 is configured to discharge payloads to the packaging material 302 so as to package the payloads. In FIG. 11, the packaging material 302 is illustrated as a flexible sheet or film that can be unwound from at least one roll. However, the packaging material 302 can be any suitable packaging material for packaging objects such as (without limitation) a cardboard box, or a flexible packaging material that is substantially flat such as (without limitation) a sheet, a film, or bubble wrap. The packaging material can be any suitable material such as plastic, paper, and so on.

The conveyor system 310 can be similar to the conveyor system 210 of FIGS. 2, 8, and 9, and can be rotationally fixed about the first direction $D_1$ so as to remain in an upright position. The conveyor system 310 comprises a first conveyor end 312 and a second conveyor end 314 that are offset from one another along the first direction $D_1$. In FIG. 2, the conveyor system 310 is show as extending along a first direction $D_1$ that is aligned with the longitudinal direction L; however, in other embodiments, the conveyor system 310 can extend in another direction that is angularly offset from the longitudinal direction L. The conveyor system 310 has a first conveyor 320 and a second conveyor 330 that are angularly offset from one another. In at least one example, the first and second conveyors 320 and 330 can define a "V" shape or a truncated or modified "V" shape as discussed below. Thus, the conveyor system 310 can function as a cradle that supports items received thereon. Thus, the conveyor system 310 can cradle payloads having curved or rounded surfaces to prevent such payloads from rolling off of the conveyor system 310.

The first conveyor 320 has a first conveyor surface 322 configured to carry payloads along the first direction $D_1$. The first conveyor 320 has a first conveyor side 324 and a second conveyor side 326 that are offset from one another and that extend between the first and second conveyor ends 312 and 314. The first conveyor side 324 can be considered to be an outer side, and the second conveyor side 326 can be considered to be an inner side. The first conveyor surface 322 can be defined by at least one conveyor belt. In one example, the first conveyor surface 322 can be defined by a plurality of conveyor belts offset from one another between the first and second conveyor ends 312 and 314. Each conveyor belt can be independently operable so as to be capable of creating spacing between lots of payloads on the conveyor surface 322. In alternative embodiments, the first conveyor surface 322 can be defined by any other suitable conveyor element configured to translate payloads such as tracks, belts, rollers, skate wheels, balls, any other suitable conveyor element, or any suitable combination of conveyor elements. The conveyor elements can be powered so as to move payloads along the first direction $D_1$. The first conveyor surface 322 can define an inner surface of the "V" shape or truncated "V" shape.

The second conveyor 330 has a second conveyor surface 332 configured to carry payloads along the first direction $D_1$. The second conveyor 330 has a first conveyor side 334 and a second conveyor side 336 that are offset from one another and that extend between the first and second conveyor ends 312 and 314. The first conveyor side 334 can be considered to be an outer side, and the second conveyor side 336 can be considered to be an inner side. The second conveyor surface 332 can be defined by at least one conveyor belt. In one example, the first conveyor surface 332 can be defined by a plurality of conveyor belts offset from one another between the first and second conveyor ends 312 and 314. Each conveyor belt can be independently operable so as to be capable of creating spacing between lots of payloads on the conveyor surface 332. In alternative embodiments, the second conveyor surface 332 can be defined by any other suitable conveyor element configured to translate payloads such as tracks, belts, rollers, skate wheels, balls, any other suitable conveyor element, or any suitable combination of conveyor elements. The conveyor elements can be powered so as to move payloads along the first direction $D_1$. Preferably, the second conveyor surface 332 is configured to move at the same speed as the first conveyor surface 322; however, embodiments of the disclosure are not so limited. The second conveyor surface 332 can define an inner surface of the "V" shape or truncated "V" shape.

The first conveyor 320 defines a first plane $P_5$ that extends between the first and second conveyor ends 312 and 314 and between the first and second conveyor sides 324 and 326.

The second conveyor 330 defines a second plane $P_6$ that extends between the first and second conveyor ends 312 and 314 and between the first and second conveyor sides 334 and 336. The first and second conveyors 320 and 330 are coupled to one another in a side-by-side arrangement so as to define an inner angle $\theta_3$ between the first and second conveyors 320 and 330. The first and second conveyors 320 and 330 are coupled to one another such that the second conveyor sides 326 and 336 are spaced closer to one another than the first conveyor sides 324 and 334. Stated differently, a distance between the second conveyor sides 326 and 336 is smaller than a distance between the first conveyor sides 324 and 334.

The angle $\theta_3$ can be defined from the first conveyor surface 322 to the second conveyor surface 332. For example, the angle $\theta_3$ can be defined from the first plane $P_5$ to the second plane $P_6$. The angle $\theta_3$ is less than 180 degrees. For example, the angle can be between 45 degrees and 135 degrees. As another example, the angle $\theta_3$ can be approximately 90 degrees, such as within ±10 degrees. The angle $\theta_3$ can be substantially equal to the angle $\theta_2$ of the conveyor system 210 of FIG. 10, although embodiments of the disclosure are not so limited. The first and second conveyors 320 and 330 can be fixedly coupled to one another such that the angle $\theta_3$ is fixed. In one example, the conveyor system 310 can include at least one support such as a bracket that attaches the first and second conveyors 320 and 330 to one another. In alternative embodiments, the first and second conveyors 120 and 130 can be coupled to one another such that the angle $\theta$ can be adjusted.

In some examples, the second conveyor sides 326 and 336 of the first and second conveyors 320 and 330 can be directly coupled to one another, while the first conveyor sides 324 and 334 can be spaced from one another. Thus, the distance between the second conveyor sides 326 and 336 can be substantially zero. In other examples, the distance between the second conveyor sides 326 and 336 can be greater than zero. Thus, the conveyor system 310 can define a modified or truncated "V" shape, where the point of the "V" is cut off. In at least some such other examples, the conveyor system 310 can include a connecting member that extends between the second sides 326 and 336, such as from the second side 326 to the second side 336. The connecting member can be a conveyor having a conveyor surface or can define any other suitable surface.

The first and second conveyors 320 and 330 can define a recess 331 therebetween. The recess 331 can have a lower end 333 and an upper end 335 that are opposite from one another. The lower end 333 can define a valley. The upper end 335 can define an opening between the first ends 324 and 334. The recess 331 can be configured to support one or more objects in the valley. The valley can be adjacent the second conveyor sides 326 and 336. The upper end 335 can be adjacent the first conveyor sides 324 and 334. The valley can be disposed entirely below the upper end.

Each of the first and second conveyors 320 and 330 can define an angle $\alpha_5$ or $\alpha_6$ with respect to a horizontal plane $H_3$. Each angle $\alpha_5$ and $\alpha_6$ may be between zero and 90 degrees. In one example, at least one of the angles $\alpha_5$ and $\alpha_6$ may be approximately 45 degrees, such as within ±10 degrees. Thus, the "V" shape or truncated "V" shape can be upright such that both the first and second conveyors 320 and 330 are angularly offset from the horizontal plane $H_3$. In another example, at least one of the angles $\alpha_5$ and $\alpha_6$ may be approximately 25 degrees, such as within ±10 degrees. A smaller angle $\alpha_5$ and/or $\alpha_6$ can make it easier to lay the packaging material 302 over the payloads.

Although not shown, the packaging system 300 can include at least one support that supports the conveyor system 310 such that the conveyor system 310 is fixed in an upright position with lower end 333 of the recess 331 always being spaced below the upper end 335. Thus, conveyor system 310 can be rotationally fixed with respect to the first direction $D_1$ such that the conveyor system 310 is prevented from rotating about an axis that extends in the first direction $D_1$.

In examples that employ flexible packaging, the packaging material handler 350 can include at least one guide 352, such as rollers, that is configured to support the packaging material 302 in a substantially "V" shape, truncated "V" shape, or "U" shape as the packaging material 302 extends from under the second end 314 of the conveyor system 310. For example, the packaging material 302 can have a first side 308 and a second side 310 that are opposite of one another. The packaging material 302 can be supported by the packaging material handler 300 in an orientation where the first side 308 of the packaging material 302 is opposite the second side 310 of the packaging material 302 so as to define a recess 305 therebetween. The recess 305 can define an open upper end 304, and closed lower end 306 that defines a valley and is spaced below the open upper end 304. The packaging material 302 is supported by the at least one guide 352 such that the packaging material 302 substantially matches a shape of the conveyor system 310 as the packaging material 302 extends out from beneath the second end 314 of the conveyor system 310. The closed lower end 306 can be defined by a bend in the packaging material 302 between the first and second sides 308 and 310. In examples where the packaging material 302 is bent, the packaging material 302 can be unwrapped from a single roll of the packaging material 302. Alternatively, the first and second sides 308 and 310 can be two separate sheets that are joined together at the closed lower end 306 by heat sealing, gluing, or other suitable joining technique. In examples where the two separate sheets are joined together, each sheet of the packaging material 302 can be unwrapped from a separate roll of the packaging material 302.

The packaging material handler 350 can include one or more of (i) at least one of a sealer (e.g., 352 and 354) and (ii) a packaging material advancer 356. The at least one sealer is configured to seal the packaging material 302 so as to form envelopes or pockets that house payloads. The at least one sealer can be configured to concurrently seal and cut the packaging material 302, or the packaging material handler 350 can include a separate cutter to cut the packaging material 302. The at least one sealer can implement any suitable sealing such as (without limitation) heat sealing or gluing. The at least one sealer can include a side sealer 354 configured to seal the first and second sides 308 and 310 of the packaging material 302 to one another. The at least one sealer can include an end sealer 352 configured to seal across the packaging material 302 from the closed lower end 306 to the upper end 304 such that the packaging material 302 forms an envelope or pocket that houses payloads.

The packaging material advancer 356 is configured to advance the packaging material 302 in the first direction $D_1$ so that the packaging material handler 350 can form subsequent envelopes or pockets. The packaging material advancer 356 can be implemented in any suitable manner. For example, the packaging material advancer 356 can include a tension roll that pulls a seam 303 of the packaging material 302 that is cut from the packaging material 302. In alternative embodiments, the packaging material advancer 356 can be a robotic arm or other suitable device that grabs the packaging material 302 and pulls the packaging material 302 along the first direction $D_1$ away from the at least one roll. The packaging system can optionally include a label applicator 358 configured to apply labels to the packages 360 formed by the packaging material handler 350.

In operation, the conveyor system 310 is configured to drive its conveyor surfaces 320 and 330 so as to discharge at least one payload from the recess 331 of the conveyor system 310 to the recess 305 of the packaging material 302. Transferring the at least one payload from the conveyor system 310 to the packaging material 302 can maintain the arrangement of the at least one payload. Thus, if multiple payloads are loaded onto the conveyor system 310 in a compacted arrangement, the payloads can be transferred to the packaging material 302 without substantially changing the arrangement of the payloads. After the at least one payload is transferred to the packaging material 302, the packaging material 302 is sealed around the at least one payload so as to form an envelope or pocket that houses the at least one payload.

It will be understood that the sortation system 100, transfer system 200, and packaging system 300 can be implemented individually, or two or more of the sortation system 100, transfer system 200, and packaging system 300 can be can be implemented together as a part of a larger system. Further, each of the sortation system 100, transfer system 200, and packaging system 300 can be implemented with other systems (not shown). It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A payload transfer system configured to transfer a payload from a first conveyor system to a second conveyor system, the payload transfer system comprising:
   a conveyor system comprising:
      a first conveyor end and a second conveyor end that are offset from one another along a first direction;
      a first conveyor having inner and outer conveyor sides and a first conveyor surface between the inner and outer conveyor sides that is configured to carry payloads between the first and second conveyor ends along the first direction; and
      a second conveyor having inner and outer conveyor sides and a second conveyor surface between the inner and outer conveyor sides of the second conveyor that is configured to carry payloads between the first and second conveyor ends along the first direction, wherein the first and second conveyors are coupled to one another such that the inner conveyor sides are spaced closer to one another than the outer conveyor sides, and the first and second conveyors are angularly offset from one another such that the first and second conveyors define a recess therebetween, the recess having an upper end and a lower end defining a valley disposed below the upper end; and
   a conveyor movement system configured to move the conveyor system along at least one of a vertical direction, and a second direction, perpendicular to the first direction.

2. The payload transfer system of claim 1, wherein the first and second conveyors define a "V" shape or a truncated "V" shape.

3. The payload transfer system of claim 1, wherein the conveyor system defines an inner angle between the first conveyor surface and the second conveyor surface that is fixed.

4. The payload transfer system of claim 1, wherein the recess has an upper end, and a lower end that is opposite the upper end and that defines a valley, the conveyor system being coupled to the conveyor movement system such that conveyor system is fixed in an upright position in which the lower end being spaced below the upper end.

5. The payload transfer system of claim 1, wherein the conveyor movement system is configured to move the conveyor system along both the vertical direction and second direction.

6. The payload transfer system of claim 1, wherein the conveyor movement system comprises a gantry robot having a gantry beam that extends along a horizontal direction, and an arm that supports the conveyor system, the arm configured to move along the gantry beam along the horizontal direction.

7. The payload transfer system of claim 6, wherein the arm is configured to move along the vertical direction so as to move the conveyor system along the vertical direction.

8. A packaging system, comprising:
   a conveyor system comprising:
      a first conveyor end and a second conveyor end that are offset from one another along a first direction;
      a first conveyor having inner and outer conveyor sides and a first conveyor surface between the inner and outer conveyor sides that is configured to carry payloads between the first and second conveyor ends along the first direction; and
      a second conveyor having inner and outer conveyor sides and a second conveyor surface between the inner and outer conveyor sides of the second conveyor that is configured to carry payloads between the first and second conveyor ends along the first direction, wherein the first and second conveyors are coupled to one another such that the inner conveyor sides are spaced closer to one another than the outer conveyor sides, and the first and second conveyors are angularly offset from one another such that the first and second conveyors define a recess therebetween, the recess having an upper end and a lower end defining a valley disposed below the upper end; and
   a packaging material handler configured to support a packaging material adjacent the second conveyor end, wherein the conveyor system is configured to discharge payloads onto the packaging material so as to package the payloads, wherein the packaging material is a flexible material, and the packaging material handler comprises at least one guide configured to support the packaging material in an orientation where the packaging material defines an open upper end and a valley below the open upper end as the packaging material extends out from under the first conveyor end.

9. The packaging system of claim 8, wherein the first and second conveyors define a "V" shape or a truncated "V" shape.

10. The packaging system of claim 8, wherein the conveyor system defines an inner angle between the first conveyor surface and the second conveyor surface that is fixed.

11. The packaging system of claim 8, comprising at least one sealer configured to seal the packaging material after a payload is discharged onto the packaging material from the conveyor system.

12. A method of transferring at least one payload, the method comprising:
supporting at least one payload in a first recess of a first conveyor system, the first recess defined between first and second conveyor surfaces of the first conveyor system that are angularly offset from one another;
moving at least one of the first conveyor system and a second conveyor system so as to align the first recess of the first conveyor system with a second recess of the second conveyor system along a first direction, the second recess defined between first and second conveyor surfaces of the second conveyor system that are angularly offset from one another;
driving the first and second conveyor surfaces of the first conveyor system so as to move the at least one payload towards the second recess of the second conveyor along the first direction; and
receiving the at least one payload in the second recess of the second conveyor system.

13. The method of claim 12, wherein the supporting step comprises:
identifying the first conveyor system from a plurality of conveyor systems arranged in one or more of (i) at least one row that extends along a second direction, perpendicular to the first direction, and (ii) at least one column that extends along a vertical direction;
translating a delivery vehicle along a track system along the one or more of the (i) at least one row and (ii) at least one column so as to position the delivery vehicle adjacent to the first recess of the first conveyor system;
discharging the at least one payload from the delivery vehicle to the first recess of the first conveyor system.

14. The method of claim 13, wherein the supporting step comprises rotating the first conveyor system along an axis that extends along the first direction before discharging the at least one payload to the first recess of the first conveyor system.

15. The method of claim 12, wherein the moving step comprises:
identifying the first conveyor system from a plurality of conveyor systems arranged in one or more of (i) at least one row that extends along a second direction, perpendicular to the first direction, and (ii) at least one column that extends along a vertical direction; and
moving the second conveyor system along one or more of the (i) at least one row and (ii) at least one column so as to align the second recess of second conveyor system with the first recess of the first conveyor system.

16. The method of claim 15, wherein the moving step comprises moving an arm of a gantry robot that supports the second conveyor system along at least one of the second direction and the vertical direction so as to align the second recess of second conveyor system with the first recess of the first conveyor system.

17. The method of claim 12, comprising, after the receiving step:
moving the second conveyor system so as to align the second recess of the second conveyor system with a third recess of a third conveyor system, the third recess defined between first and second conveyor surfaces of the third conveyor system that are angularly offset from one another;
driving the first and second conveyor surfaces of the second conveyor system so as to move the at least one payload towards the third recess of the third conveyor; and
receiving the at least one payload in the third recess of the third conveyor system.

18. The method of claim 17, comprising, after receiving the at least one payload in the third recess, driving the first and second conveyor surfaces of the third conveyor system so as to move the at least one payload into a packaging material.

19. The method of claim 12, wherein the moving step comprises moving an arm of a gantry robot that supports the first conveyor systems so as to align the first recess of the first conveyor system with the second recess of the second conveyor system, and the method comprises driving the first and second conveyor surfaces of the second conveyor system so as to move the at least one payload into a packaging material.

* * * * *